Oct. 11, 1949.                    R. A. NIELSEN                    2,484,243
                    DRILLING MACHINE FOR THE SIMULTANEOUS
                            DRILLING OF THREE HOLES
                         Original Filed Feb. 23, 1946
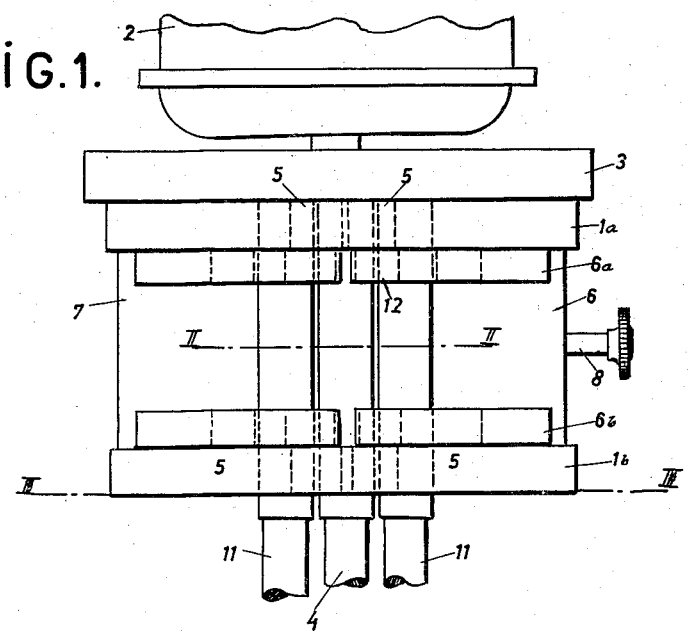
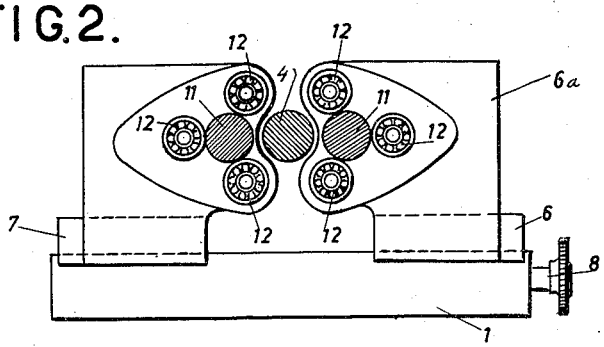
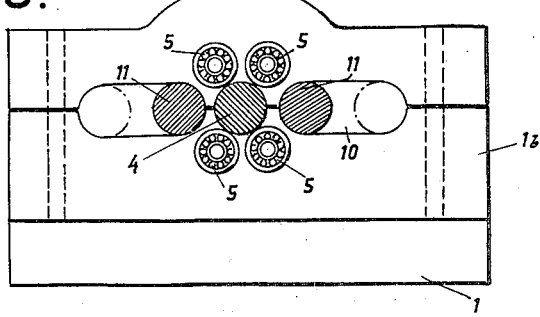

Patented Oct. 11, 1949

2,484,243

UNITED STATES PATENT OFFICE 2,484,243

DRILLING MACHINE FOR THE SIMULTANEOUS DRILLING OF THREE HOLES

Robert Alexander Nielsen, Copenhagen, Denmark

Substituted for abandoned application Serial No. 649,626, February 23, 1946. This application February 26, 1948, Serial No. 10,996. In Denmark November 10, 1944

Section 1, Public Law 690, August 8, 1946
Patent expires November 10, 1964

1 Claim. (Cl. 77—24)

The present invention relates to an improved drilling machine for simultaneously drilling three holes.

Hitherto known machines of this kind are subject to the drawback that it is not possible to drill the three holes very close to each other, because the spindle bearings prevent the adjustment laterally of the spindles to the radial extent of the said bearings. It has been proposed to arrange the bearings of the center spindle in a staggered position in relation to the other spindle bearings by which is attained that the spacing of the spindles is reduced to the radial extent of a single bearing.

The object of the present invention is to further improve the relative adjustment of spacing between the three drill spindles in a drilling machine for simultaneously drilling three holes, to the effect that the spindles may be relatively adjusted in such a manner that they almost touch each other, thus rendering possible the drilling of three holes so close to each other as practically possible. This object is attained by means of a specially constructed arrangement of ball bearings as particularly described in the following description with reference to the accompanying drawing.

Fig. 1 is a top elevation of a drilling machine according to the invention,

Fig. 2 is a sectional view on line II—II in Fig. 1, and

Fig. 3 is a sectional view on line III—III in Fig. 1.

The drilling machine comprises a base 1 provided with two interspaced upright and parallel walls 1a and 1b. This base 1 may be mounted in any suitable frame not shown in the drawing.

A driving motor 2 is employed for operating the drill mechanism by any conventional means, preferably a chain drive enclosed in a gear box 3 but not detailed in the drawing.

The two upright walls 1a and 1b have each a bore arranged in alignment and through which a spindle 4 is carried, the spindle having a slightly smaller diameter than the said bores. Four ball bearings 5 are arranged in such a manner in each upright wall 1a and 1b that they encircle the spindle 4 and with their outer circumference abut the spindle surface. Each ball bearing is attached by its inner race to the wall and its outer race abutting the spindle surface. Preferably these ball bearings 5 are arranged in each wall in the same plane.

Two slides 6 and 7 are arranged upon the base 1 between the upright walls 1a and 1b in such a manner that they may be displaced to and from each other. Any known means for displacing the slides in relation to each other may be employed, for instance as shown in the drawing a lead screw 8 coacting with threaded lugs attached to each slide, which lugs are not visible on the drawing. The two slides are identical, and one only will be described in the following. The slide 6 has an upright wall 6a that is disposed adjacent the upright wall 1a, and another upright wall 6b that is adjacent the upright wall 1b. Each upright wall 1a and 1b has a horizontal incision 10, Fig. 3, and each slide wall 6a and 6b a bore, through which apertures a spindle 11 is carried parallel to the spindle 4. To each slide wall 6a and 6b three ball bearings 12, Fig. 2, are attached in the same manner as described above, encircling the spindle 11.

In this manner is attained that while the position of the center spindle remains unaltered, the two laterally disposed spindles 11 carried by the slides 6 and 7 respectively may by means of the lead screw 8 be moved nearer to or farther from the center spindle 4, and owing to the particular arrangement of the bearings 5 supporting the center spindle 4, and the bearings 12 supporting the lateral spindles 11, it is possible to move the latter spindles along the incisions in the upright walls 1a and 1b so close to the center spindle 4 as to almost touching it.

It will be understood that instead of ball bearings, roller bearings may be utilized to the same effect.

The present application is a substitute for applicant's abandoned application, Serial No. 649,626 filed February 23, 1946.

I claim:

In a drilling machine for the simultaneous drilling of three holes, the combination with a frame of a carrier member, two interspaced upright walls attached to the carrier member, a central drill spindle carried through holes in the said walls, two slides displaceable in opposite directions between the said walls, vertical plates projecting from each of the said slides, a drill spindle carried through holes in each slide plate and through elongated apertures in the adjacent upright walls of the carrier member at either side of the central spindle, a plurality of ball bearings attached to each upright wall of the carrier member and encircling the central drill spindle, a plurality of ball bearings attached to each vertical plate of the slides and encircling the lateral drill spindle carried therethrough, means for attaching the inner race of each ball bearing to the supporting member in question so that the outer ball bearing race bears upon the surface of the spindle in question, means for displacing the slides in relation to each other, a driving motor, and means for transmitting motive force from the motor to the spindles.

ROBERT ALEXANDER NIELSEN.

No references cited.